US012810078B2

(12) United States Patent
Lee et al.

(10) Patent No.: US 12,810,078 B2
(45) Date of Patent: Nov. 24, 2026

(54) DEVICE AND METHOD FOR DIALOGUE STATE TRACKING

(71) Applicant: UIF (University Industry Foundation), Yonsei University, Seoul (KR)

(72) Inventors: Kyong Ho Lee, Seoul (KR); Ye Seul Gong, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 166 days.

(21) Appl. No.: 18/798,556

(22) Filed: Aug. 8, 2024

(65) Prior Publication Data

US 2025/0061283 A1 Feb. 20, 2025

(30) Foreign Application Priority Data

Aug. 18, 2023 (KR) ........................ 10-2023-0108034

(51) Int. Cl.
*G06F 17/00* (2019.01)
*G06F 40/30* (2020.01)

(52) U.S. Cl.
CPC .................................... *G06F 40/30* (2020.01)

(58) Field of Classification Search
CPC ...................................................... G06F 40/30
USPC ............................................................ 704/9
See application file for complete search history.

(56) References Cited

FOREIGN PATENT DOCUMENTS

KR 10-2021-0009617 A 1/2021

OTHER PUBLICATIONS

Guo; Dual Slot Selector via Local Reliability Verification for Dialogue State Tracking; c 2021 (Year: 2021).*
Zhang; Find or Classify; c 2020 (Year: 2020).*
Zeng; Multi-Domain Dialogue State Tracking based on State Graph; c 2020 (Year: 2020).*
Zhang, Jianguo et al., "Find or Classify? Dual Strategy for Slot-Value Predictions on Multi-Domain Dialog State Tracking" Proceedings of the Ninth Joint Conference on Lexical and Computational Semantics (*SEM), pp. 154-167, 2020.
Kim, Sungdong et al., Efficient Dialogue State Tracking by Selectively Overwriting Memory, ACL 2020, pp. 567-582.

* cited by examiner

*Primary Examiner* — Paul C Mccord

(57) ABSTRACT

Provided are a device and method for dialogue state tracking (DST). With the device and method for DST, an appropriate dialogue state for a user's intention is tracked by hierarchically classifying each slot in consideration of multiple features of domain-specific slots extracted from a dialogue with the user and tracking a state value of each of the hierarchically classified slots using a dual dynamic graph neural network.

16 Claims, 9 Drawing Sheets

DEVICE AND METHOD FOR DIALOGUE STATE TRACKING

CROSS-REFERENCE TO RELATED APPLICATION

This application claims priority to and the benefit of Korean Patent Application No. 2023-0108034, filed on Aug. 18, 2023, the disclosure of which is incorporated herein by reference in its entirety.

BACKGROUND

1. Field of the Invention

The present disclosure relates to a device and method for tracking a multidomain dialogue state, and more particularly, a device and method for tracking a multidomain dialogue state using a hierarchical slot selector and a dual dynamic graph.

2. Discussion of Related Art

Task-oriented dialogue (TOD) systems aim to efficiently accomplish specific user needs, such as a restaurant reservation, hailing a taxi, and the like, from users' dialogues. A TOD system should be able to understand a user's request as expressed in a multiturn dialogue with the user, and generate an appropriate response to the user's request such that the user may achieve his or her goal through a natural dialogue with the TOD system.

To this end, TOD systems may perform dialogue state tracking (DST). DST involves tracking a dialogue state in which a user's request dynamically changing in a multiturn dialogue between the user and a TOD system is expressed using a triplet of domain, slot, and value, making it possible to accurately understand the user's intention. In other words, according to DST, aims are extracted from dialogues and set as domains, an attribute that each domain may have is set as a slot, and state values of attributes extracted from the dialogues are allocated to slots, such that a dialogue state of each domain which is at least one aim is tracked. Here, DST involves changing a state value of each slot in each domain according to the content of a dialogue.

A TOD system may include a separate DST device for the purpose of DST. The DST device continuously tracks and updates a user's intention of which details, such as a location, dates for changing hotel reservations, and the like, change frequently during a dialogue with the user such that the TOD system can easily determine which hotel the user wants to stay at from the current dialogue.

Therefore, the DST device should be able to consistently track the user's intention across various domains during the multiturn dialogue. However, in multiturn and multidomain dialogues, state values of slots may have the same indicating words. For example, during a dialogue about traveling, slots for a departure point and destination in the domain "taxi" may be the same as the names of a hotel or restaurant mentioned in a previous dialogue turn. Also, slots may have multiple features, and thus it is necessary to distinguish between values that states may have. Therefore, graph model-based DST devices according to the related which only learn domain-slot relationships in consideration of only a single feature of a slot without understanding the entire dialogue context are inappropriate for tracking values with the same indicating words.

SUMMARY OF THE INVENTION

The present disclosure is directed to providing a dialogue state tracking (DST) device and method for accurately tracking a dialogue state by hierarchically classifying each slot in consideration of multiple features of domain-specific slots extracted from a dialogue with a user.

The present disclosure is also directed to providing a DST device and method for extracting a state value of an appropriate domain slot for a user's intention using a dual dynamic graph neural network.

According to an aspect of the present disclosure, there is provided a device for DST including a memory and a processor configured to execute at least some of operations based on a program stored in the memory. In dialogue states including pairs of each of multiple slots and a state value according to turn-specific dialogues of a multiturn dialogue, the processor determines whether a state value of each of the multiple slots is updated to classify the multiple slots as inherit slots and update slots, determines whether state values that the update slots may have are limited to multiple predefined possible values to hierarchically classify the update slots as categorical slots and span slots, and acquires and updates a state value of each of the categorical slots and the span slots using a possible value index and a dialogue index which are extracted by separately generating a value graph for the classified categorical slots and a dialogue graph for the span slots and performing neural network computation on the value graph and the dialogue graph.

The processor may extract the turn-specific dialogues from the multiturn dialogue based on a turn order, receive the turn-specific dialogues based on the turn order with the dialogue states which are tracked according to turn-specific dialogues until a previous turn, and encode the turn-specific dialogues and the dialogue states to generate multiple dialogue vectors and multiple slot vectors.

The processor may further acquire a possible value set including all state values that the span slots among the multiple slots may have and encode the acquired possible value set to generate multiple possible value vectors.

The processor may classify, on the basis of the multiple slot vectors, the multiple slots as the update slots of which state values are to be updated according to a current turn-specific dialogue and the inherit slots of which state values are to be carried over and may classify the update slots as the categorical slots which may have state values limited to the multiple possible values and the span slots which may have unlimited state values.

The processor may connect multiple dialogue nodes, multiple slot nodes, and multiple possible value nodes, which are generated by projecting multiple possible value vectors acquired by encoding the multiple dialogue vectors, the multiple slot vectors, and the multiple possible values to an embedding space, using edges to generate the value graph, and may connect multiple dialogue nodes and multiple slots, which are generated by projecting the multiple dialogue vectors and the multiple slot vectors to the embedding space, using edges to generate the dialogue graph.

In the value graph, the processor may connect the multiple slot nodes to the multiple dialogue nodes and the multiple possible value nodes according to detailed formats of the slots using edges. In the dialogue graph, the processor may connect the multiple dialogue nodes based on the turn order using edges, connect a dialogue node for a current turn-specific dialogue to all other dialogue nodes using edges, and connect each of the multiple slot nodes to a dialogue node of a turn in which a state value of the dialogue state is updated using an edge.

The processor may estimate a weight of each edge by performing neural network computation on the value graph, determine a possible value that is most likely to be paired with each slot among the multiple possible values, and extract the possible value index, and may estimate a weight of each edge by performing neural network computation on the dialogue graph, determine a turn-specific dialogue that has the closest correlation with each slot among the multiple turn-specific dialogues, and extract the dialogue index.

The processor may receive and encode the turn-specific dialogues, the dialogue states, the possible value indexes, the dialogue indexes, and the multiple possible values using neural network computation to acquire a context representation vector.

The processor may perform neural network computation on the context representation vector to select and acquire a state value to be updated in the categorical slots from among the multiple possible values.

The processor may perform neural network computation on the context representation vector to extract a state value to be updated in the span slots from a current turn-specific dialogue.

According to another aspect of the present disclosure, there is provided a method for DST performed by a processor, the method including, in dialogue states including pairs of each of multiple slots and a state value according to turn-specific dialogues of a multiturn dialogue, classifying the multiple slots as inherit slots and update slots by determining whether a state value of each of the multiple slots is updated, and hierarchically classifying the update slots as categorical slots and span slots by determining whether state values that the update slots may have are limited to multiple predefined possible values, and acquiring and updating a state value of each of the categorical slots and the span slots using a possible value index and a dialogue index which are extracted by separately generating a value graph for the classified categorical slots and a dialogue graph for the span slots and performing neural network computation on the value graph and the dialogue graph.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, specific embodiments of the present disclosure will be described with reference to the drawings. The following detailed description is provided to help with comprehensive understanding of a method, a device, and/or a system described in this specification. However, this is only an example, and the present invention is not limited thereto.

In describing embodiments of the present disclosure, when it is determined that detailed description of well-known technologies related to the present invention may unnecessarily obscure the gist of embodiments, the detailed description will be omitted. Terms to be described below are terms defined in consideration of functions in the present invention, and may vary depending on the intention, practice, or the like of a user or operator. Therefore, the terms should be defined on the basis of the overall content of this specification. Terms used in the detailed description are only used to describe embodiments and should not be construed as limiting. Unless otherwise clearly specified, a singular expression includes the plural meaning. In this description, an expression such as "include" or "have" is intended to indicate certain features, numerals, steps, operations, elements, or some or combinations thereof, and should not be construed as excluding the presence or possibility of one or more other features, numerals, steps, operations, elements, or some or combinations thereof. Also, the terms "unit," "device," "module," "block," and the like described in this specification refer to units for processing at least one function or operation, which may be implemented by hardware, software, or a combination of hardware and software.

Figure 1:
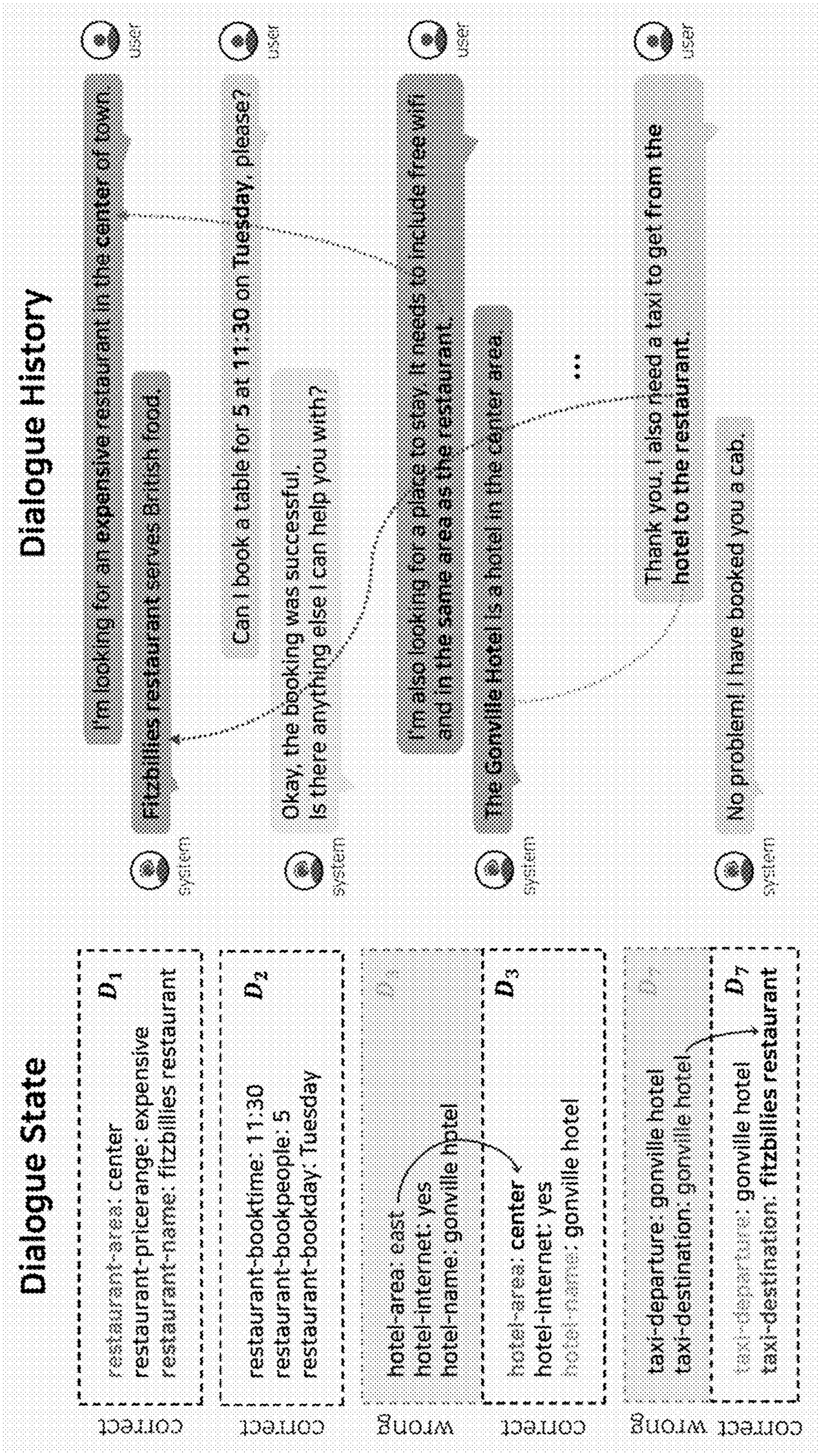
FIG. 1 is a diagram illustrating a dialogue state tracked by a dialogue state tracking (DST) device from a dialogue with a user.

FIG. 1 is a diagram illustrating a dialogue state tracked by a dialogue state tracking (DST) device from a dialogue with a user.

As described above, a task-oriented dialogue (TOD) system may include a DST device, and the DST device extracts an aim from a multiturn dialogue between a user and the TOD system to set the aim as a domain, sets an attribute that each domain may have as a slot, and assigns a state value for an attribute extracted from a turn-specific dialogue to a slot, tracking a change in the state value of a slot for each domain representing the aim during the dialogue.

In the example of FIG. 1, the DST device may extract a domain of restaurant, which is an aim, from first and second turn dialogues $D_1$ and $D_2$ between a user and the TOD system, extract a domain of hotel from a third turn dialogue $D_3$, and extract a domain of taxi from a seventh turn dialogue $D_7$. Then, the DST device sets multiple slots which are attributes of the extracted domains and collects a state value of each of the set slots. A slot represents an attribute of each extracted domain, and thus different slots may be set for domains. In FIG. 1, area, price range, and name slots are set for the restaurant domain, whereas departure and destination slots are set for the taxi domain. Also, even identical domains of restaurant may have different slots. In FIG. 1, the restaurant domain extracted from the first-turn dialogue $D_1$ has slots related to restaurant information, such as a location, prices, and a name, whereas the restaurant domain extracted from the second-turn dialogue $D_2$ has slots related restaurant reservations such as a reservation time, the number of people, and the date of a reservation.

The DTS device extracts a state value of each slot set for each domain from a multiturn dialogue and matches the state value to a corresponding slot, thereby allocating the state value to the slot or updating a previously allocated state value.

In the multiturn dialogue shown in FIG. 1, the DTS device may extract "center" as a state value of the area slot of the restaurant domain and extract "Fitzbillies restaurant" as a state value of the name slot from the first-turn dialogue $D_1$, and may extract "11:30" as a state value of the reservation time slot of the restaurant domain from the second-turn dialogue $D_2$.

The same indicating words and similar indicating words frequently appear in a multiturn dialogue. Accordingly, the DTS device should extract "center" and "Fitzbillies restaurant" as a state value of the area slot of the hotel domain and a state value of the destination slot of the taxi domain but may incorrectly extract "east" and "Gonville hotel."

To prevent such a DST error, in consideration of multiple features of slots, the DTS device of the present disclosure not only classifies each slot as an update slot of which a value is updated according to the context of a dialogue or an inherit slot which inherits a previous value of the slot but also hierarchically classifies each slot as a categorical slot or a span slot according to schema information. For a categorical slot, multiple possible values are set in advance as selectable state values, and a state may be selected and set from among the set possible values only. For a span slot, no possible value is provided, and a state value may be extracted from a dialogue and set.

Also, a dual dynamic graph neural network is used for classified slots to understand the context of a dialogue such that a state value of an appropriate domain slot for a user's intention can be correctly extracted.

Figure 2:
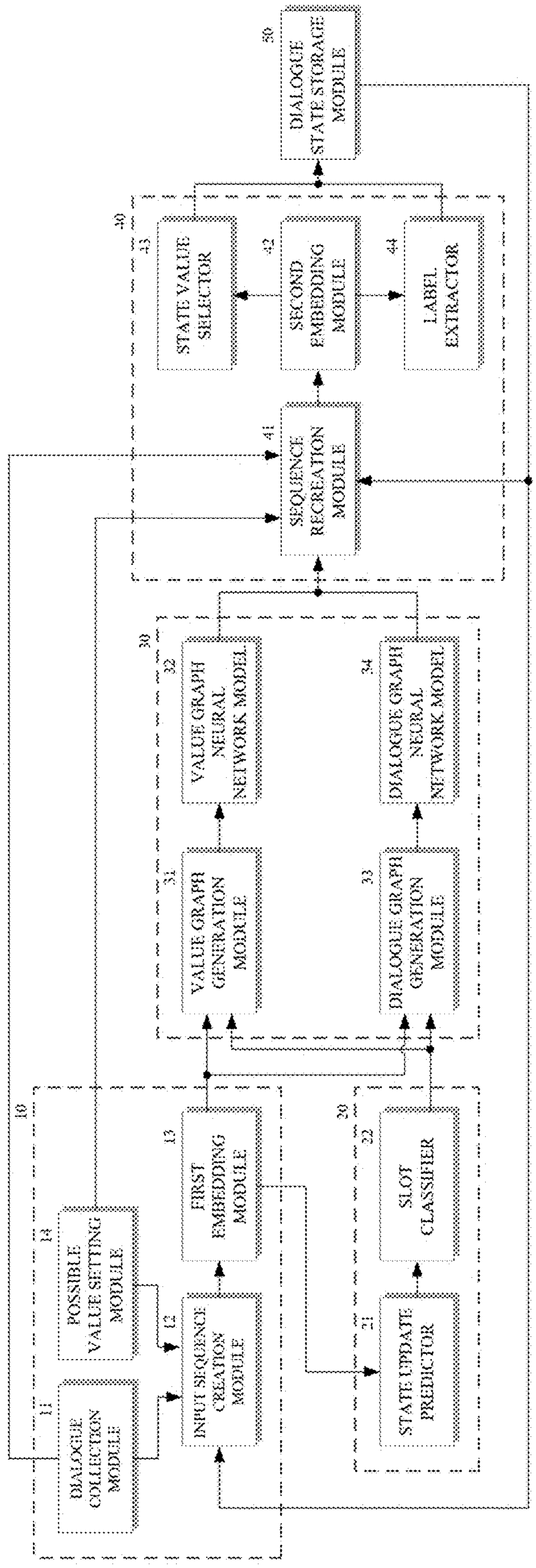
FIG. 2 is a diagram illustrating a configuration of the DST device schematically divided by operations being performed according to an exemplary embodiment.
Figure 3A:
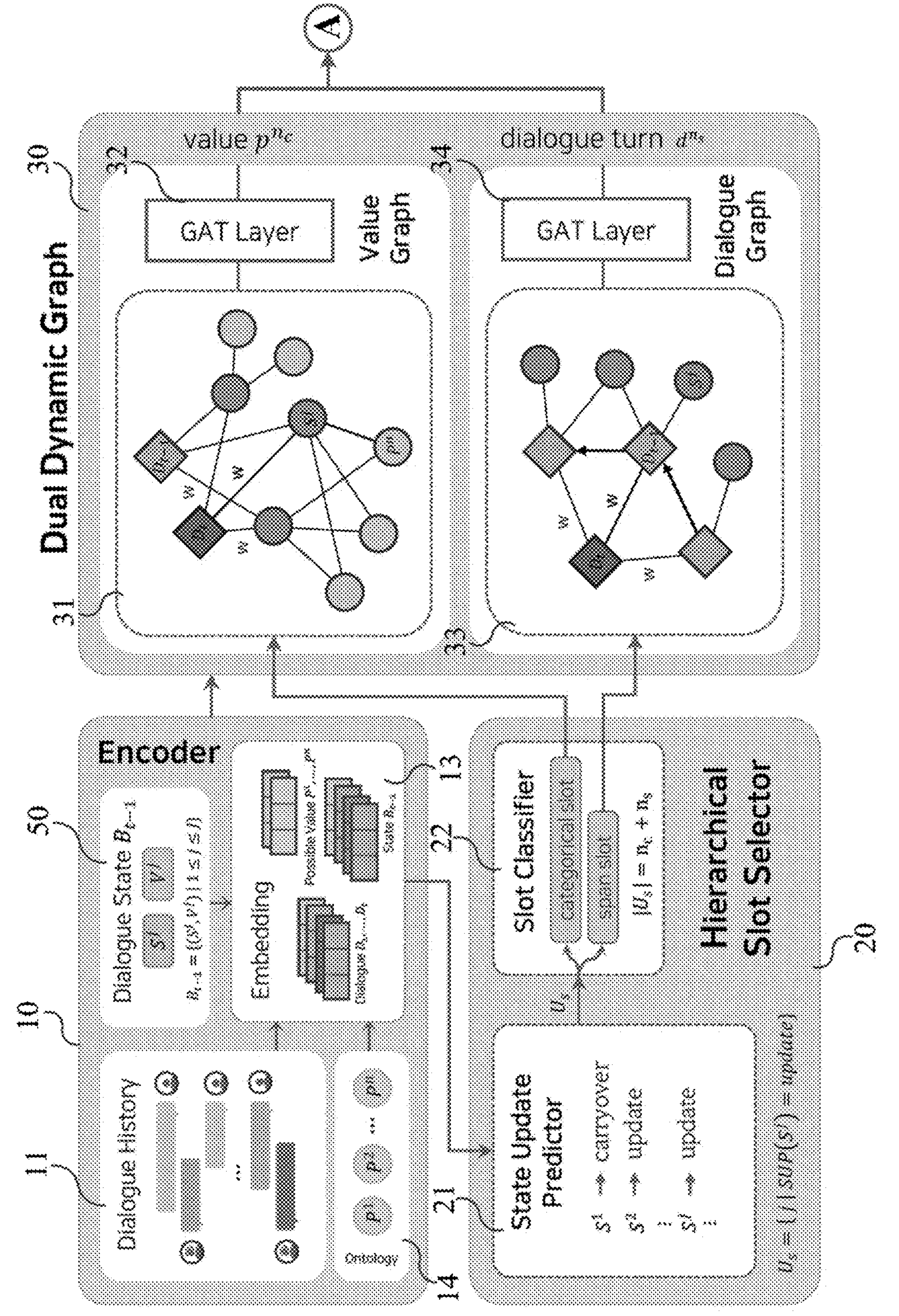
FIGS. 3A and 3B are diagram schematically illustrating overall operations of the DST device of FIG. 2.
Figure 3B:
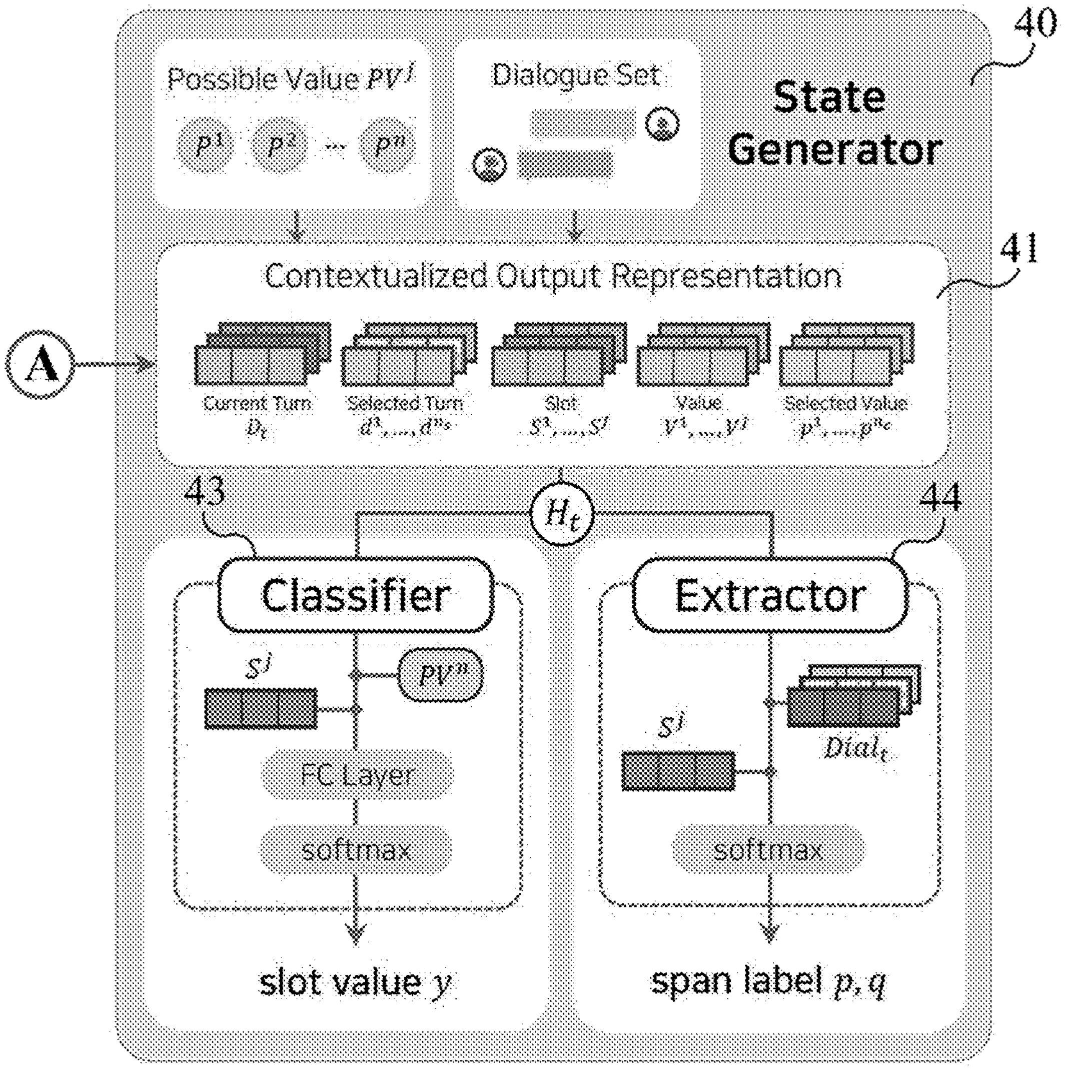

FIG. 2 is a diagram illustrating a configuration of the DST device schematically divided by operations being performed according to an exemplary embodiment, and FIGS. 3A and 3B are diagram schematically illustrating overall operations of the DST device of FIG. 2.

Referring to FIG. 2, the DST device of the present disclosure may include an encoder 10, a hierarchical slot selector 20, a dual dynamic graph neural network module 30, a state generator 40, and a dialogue state storage module 50.

The encoder 10 receives a dialogue $D_t$ of a specific turn t and an already acquired dialogue state $B_{t-1}$ tracked until a previous turn t−1 from entire dialogue history ($D=\{D_1, D_2, \ldots, D_T\}$) including multiple turns t (here, $t \in \{1, 2, \ldots, T\}$) with a user, acquires an input sequence $X_t$ by combining the dialogue $D_t$ with the dialogue state $B_{t-1}$, and acquires turn-specific dialogue vectors and slot vectors by encoding the acquired input sequence $X_t$.

The encoder 10 may include a dialogue collection module 11, an input sequence creation module 12, and a first embedding module 13. The dialogue collection module 11 acquires the dialogue history D of all the T turns with the user. Then, the dialogue collection module 11 divides the acquired entire dialogue history D by turn to extract a turn-specific dialogue $D_t$. The turn-specific dialogue $D_t$ may be represented as $\mathcal{D}_t = R_t \oplus ; \oplus U_t \oplus [SEP]$ Here, $U_t$ may be user speech, and $R_t$ may be a system response. Also, ";" is a speaker distinguishment token for distinguishing between user speech $U_t$ and a system response $R_t$, and [SEP] is a turn end token for indicating the end of a dialogue turn. $\oplus$ is a concatenation operator.

The input sequence creation module 12 sequentially receives the turn-specific dialogues $D_1$ from the dialogue collection module 11, receives a dialogue state $B_{t-1}$ of a previous turn t−1 which is tracked from dialogues $D_1$ to $D_{t-1}$ until the previous turn t−1 and stored in the dialogue state storage module 50, and combines the turn-specific dialogues $D_t$ with the dialogue state $B_{t-1}$ of the previous turn t−1 to acquire an input sequence $X_t$ of the current dialogue turn t.

Here, the input sequence $X_t$ may be acquired according to Equation 1.

$$X_t = [CLS]_t \oplus \mathcal{D}_t \oplus \mathcal{B}_{t-1} \qquad \text{[Equation 1]}$$

Here, [CLS] is a turn distinguishment token [CLS] which is a special token for distinguishing dialogue turns t in the dialogue history D of all the T turns T. The turn distinguishment token [CLS] may be added when a turn-specific dialogue $D_t$ is applied to the input sequence creation module 12 or the dialogue collection module 11 extracts a turn-specific dialogue $D_t$ from the dialogue history D.

The dialogue state $B_t$ of each turn t stored in the dialogue state storage module 50 may be a set of slot-state-value pairs $$B_t^j = [\text{SLOT}]^j \oplus S^j \oplus - \bigoplus V^j$$

each of which is obtained by combining a slot $S^j$ and a state value $V^j$. Here, "-" is a value distinguishment token for distinguishing between the slot $S^j$ and the state value $V^j$ in a $j^{th}$ slot-state-value pair $B_t^j$, and $[\text{SLOT}]^j$ is a slot distinguishment token for distinguishing between the $j^{th}$ slot-state-value pair $B_t^j$ from other $j^{th}$ slot-state-value pairs. Here, each slot $S^j$ may be set as a combination of a domain name and a slot name, such as restaurant-area or taxi-destination in the example of FIG. 1, such that the domain can also be distinguished.

When the number of slots which are trackable by the DST device is J (e.g., 30), a dialogue state $B_t$ may be a set $$\mathcal{B}_t = \mathcal{B}_t^1 \oplus \ldots \ominus B_t^J$$

of J slot-state-value pairs ($B_t^1, B_t^2, \ldots, B_t^J$). Therefore, a dialogue state $B_t$ of each turn t may be represented as $B_t=\{(S^j, V^j) | 1 \le j \le J\}$.

The input sequence creation module 12 which may be omitted is an element for inputting a turn-specific dialogue $D_t$ and a dialogue state $B_{t-1}$ of a previous turn t−1 to the first embedding module 13.

The first embedding module 13 may receive the input sequence $X_t$ obtained by combining the turn-specific dialogues $D_t$ with the dialogue state $B_{t-1}$ of the previous turn t−1 and encode the input sequence $X_t$ to generate a turn-specific vector and a slot vector. The first embedding module 13 may be implemented as an artificial neural network, specifically, a pretrained language model (PrLM). Here, the first embedding module 13 may generate a turn-specific dialogue vector from the turn-specific dialogue $D_t$ of the input sequence $X_t$ and separate slot-state-value pairs $B_{t-1}^1, B_{t-1}^2, \ldots, B_{t-1}^J$ according to a slot distinguishment token $[\text{SLOT}]^j$ to generate multiple different slot vectors.

Meanwhile, the encoder 10 may further include a possible value setting module 14. The possible value setting module 14 may provide possible values $p^1$ to $p^n$ representing all possible state values that a slot may have to the input sequence creation module 12. As described above, slots may be classified as categorical slots and span slots on the basis of characteristics of state values that the slots may have. In the case of a categorical slot, a state value may be extracted from a dialogue, or a state value may be selected from among the multiple possible values $p^1$ to $p^n$ which are set in advance and set. Therefore, in the case of a categorical slot, the possible values $p^1$ to $p^n$ which are state values that each slot may have are provided in advance such that a dialogue state can be tracked more effectively with accuracy.

Accordingly, the possible value setting module 14 may transmit the multiple possible values $p^1$ to $p^n$ to the input sequence creation module 12, and the input sequence creation module 12 may create the input sequence $X_t$ by combining the multiple possible values $p^1$ to $p^n$ with the turn-specific dialogues $D_t$ and the dialogue state $B_{t-1}$. As shown in FIGS. 3A and 3B, when the input sequence $X_t$ combined with the possible values $p^1$ to $p^n$ is input, the first embedding module 13 may encode not only the turn-specific dialogue $D_t$ and the set of the multiple slot-state-value pairs $(B_t^1, B_t^2, \ldots, B_t^J)$ but also the multiple possible values $p^1$ to $p^n$ to generate turn-specific dialogue vectors, multiple slot vectors, and multiple possible value vectors.

Meanwhile, the hierarchical slot selector 20 receives the multiple slot vectors applied from the encoder 10 to hierarchically classify a feature of each slot. The hierarchical slot selector 20 may include a state update predictor 21 and a slot classifier 22.

Figure 4:
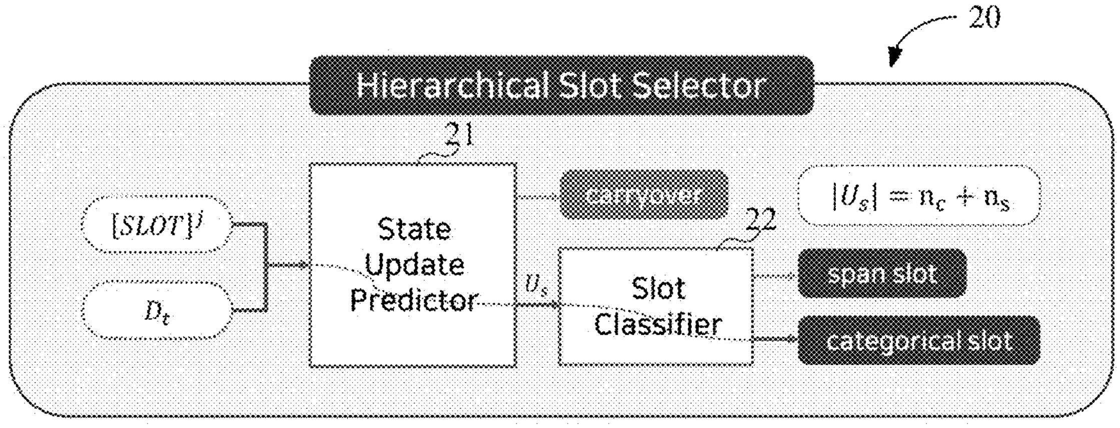
FIG. 4 is a diagram illustrating operations of a hierarchical slot selector of FIG. 2 in detail.
Figure 5:
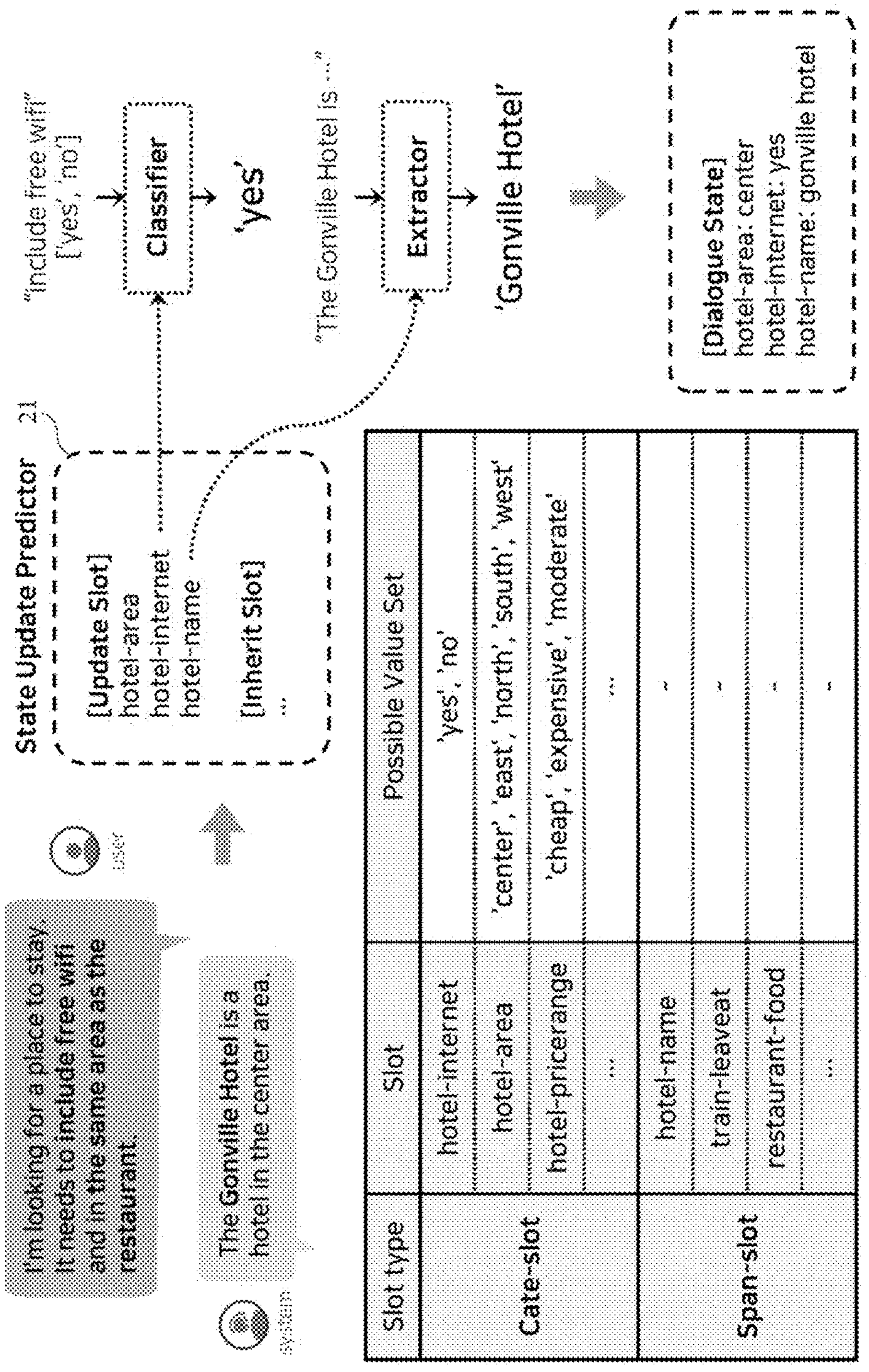
FIG. 5 is a diagram illustrating slots classified by the hierarchical slot selector of FIG. 2.

FIG. 4 is a diagram illustrating operations of the hierarchical slot selector of FIG. 2 in detail, and FIG. 5 is a diagram illustrating slots classified by the hierarchical slot selector of FIG. 2.

As shown in FIG. 4, the state update predictor 21 receives the multiple slot vectors from the encoder 10 and determines whether to update a state from each of the received slot vectors. The state update predictor 21 may be implemented as an artificial neural network and may estimate an update score by performing neural network computation on each of the received slot vectors and determine whether to update a state according to the estimated update score.

As an example, when a $j^{th}$ slot vector is applied, the state update predictor 21 estimates an update score $\text{Total\_score}_j$ for the $j^{th}$ slot vector. When the update score $\text{Total\_score}_j$ estimated as shown in Equation 2 exceeds a threshold $\delta$, the state update predictor 21 determines the $j^{th}$ slot $S^j$ of the dialogue state $B_t$ as an update slot paired with a state value $V^j$ which is to be updated on the basis of a $t^{th}$ turn dialogue $D_t$. On the other hand, when the update score $\text{Total\_score}_j$ is the threshold $\delta$ or less, the state update predictor 21 determines that the $j^{th}$ slot $S^j$ is an inherit slot, that is, a state value $V^j$ of the $j^{th}$ slot $S^j$ in the previous dialogue state $B_{t-1}$ is to be carried over in the dialogue state $B_t$ of the current turn t.

$$SUP(S^j) = \begin{cases} \text{update}, & \text{if Total\_score}_j > \delta \\ \text{carryover}, & \text{otherwise} \end{cases} \quad \text{[Equation 2]}$$

When each of multiple slots is classified as an update slot or an inherit slot, the state update predictor 21 selects a set $(U_s=\{j|SUP(S^j)=\text{update}\})$ of update slots among the classified slots and transmits the update slot set $U_s$ to the slot classifier 22. In the case of an inherit slot, a state value $V^j$ of a previous dialogue state $B_{t-1}$ is to be carried over to a current dialogue state $B_t$, and thus no additional task is required. Accordingly, in the present disclosure, no additional task is performed on inherit slots, which reduces computational cost.

When the update slot set $U_s$ is received from the state update predictor 21, the slot classifier 22 classifies the update slots of the received update slot set $U_s$ as categorical slots and span slots.

The slot classifier 22 may classify slots in various ways and may be implemented as an artificial neural network to classify slots. As an example, settable types, subtypes, names, and the like of slots have already been proposed as shown in Table 1 in various studies on the basis of MultiWOZ 2.2, which is a representative dataset used for DST, and are being used, and thus it is assumed that slots are classified herein on the basis of the studies according to the related art.

TABLE 1

| Type | Sub Type | Slot Name |
|---|---|---|
| Cate Slot | pricerange | hotel-pricerange, restaurant-pricerange |
| | area | attraction-area, hotel-area, restaurant-area |
| | number | hotel-bookpeople, hotel-bookstay, hotel-stars, restaurant-bookpeople, train-bookpeople |
| | day | hotel-bookday, train-day, restaurant-bookday |
| | boolean | hotel-internet, hotel-parking |
| | station | train-departure, train-destination |
| | type | hotel-type, attraction-type |
| Span Slot | name | attraction-name, hotel-name, restaurant-name, restaurant-food |
| | location | taxi-departure, taxi-destination |
| | time | restaurant-booktime, taxi-arriveby, taxi-leaveat, train-arriveby, train-leaveat |

For the categorical slots of Table 1, sets of possible values which are settable depending on subtype may be defined as shown in Table 2 in advance and provided. Different possible value sets are provided according to subtypes of slots.

TABLE 2

| Sub Type | Possible Value Set |
|---|---|
| pricerange | cheap, expensive, moderate |
| area | centre, east, north, south, west |
| number | 0, 1, 2, 3, 4, 5, 6, 7, 8, 9, 10, 15 |
| day | monday, tuesday, wednesday, thursday, friday, saturday, sunday |
| boolean | yes, no |
| station | birmingham new street, bishops stortford, broxbourne, cambridge, ely, kings lynn, leicester, london kings cross, london liverpool street, norwich, peterborough, stansted airport, stevenage |
| hotel type | guesthouse, hotel |
| attraction type | architecture, boat, cinema, college, concerthall, entertainment, museum, multiple sports, nightclub, park, swimmingpool, theatre |

As shown in Tables 1 and 2, the slot classifier 22 may classify slots that may have limited state values as categorical slots, and classify other slots as span slots.

As shown in the example of FIG. 5, when the state update predictor 21 classifies hotel-area, hotel-Internet, and hotel-name slots as update slots and classifies other slots as inherit slots in the turn-specific dialogues $D_t$, the slot classifier 22 may classify the hotel-Internet slot and the hotel-area slot as categorical slots. The reason is that the hotel-Internet slot has "yes" or "no" as possible values, and the hotel-area slot has "center," "east," "north," "south," and "west" as possible values.

On the other hand, in the case of the hotel-name slot, no possible value is provided, and a label extractor 44 extracts the hotel name "Gonville Hotel" from the dialogue later. Accordingly, the slot classifier 22 may determine the hotel-name slot to be a span slot.

When the update slots of the update slot set $U_s$ are classified categorical slots and span slots, the slot classifier 22 checks a number $n_c$ of classified categorical slots and a number $n_s$ of classified span slots. Since the sum is the number $n_c$ of classified categorical slots and the number $n_s$ of classified span slots is the number of update slots of the update slot set $U_s$, $|U_s|=n_c+n_s$.

The dual dynamic graph neural network module 30 generates a value graph and a dialogue graph according to the categorical slots and span slots classified by the slot classifier 22 and performs neural network computation on each of the generated value graph and dialogue graph to extract a value index $p^{n_c}$ and a dialogue turn index $d^{n_s}$.

The dual dynamic graph neural network module 30 may include a value graph generation module 31, a value graph neural network model 32, a dialogue graph generation module 33, and a dialogue graph neural network model 34.

The value graph generation module 31 generates a value graph by embedding a slot vector, turn-specific dialogue vectors, and multiple possible value vectors, which are acquired from the first embedding module 13 for each slot classified as a categorical slot by the slot classifier 22, into an embedding space.

The value graph generation module 31 generates multiple dialogue nodes $N_d$ by projecting multiple dialogue vectors according to turn-specific dialogues $D_1$ to $D_t$ until the current turn t to the virtual embedding space, generates multiple slot nodes $N_s$ by projecting slot vectors according to multiple categorical slots, and generates multiple possible value nodes $N_v$ by projecting multiple possible value vectors.

Then, the value graph generation module 31 connects each of the multiple dialogue nodes $N_d$ and each of the multiple slot nodes $N_s$ using an edge e and connects the slot of each slot node $N_s$ to possible value nodes $N_v$ of possible values which may be paired with the slot of each slot node $N_s$ using edges. Here, as shown in FIGS. 3A and 3B, the value graph generation module 31 does not connect the multiple dialogue nodes $N_d$ to each other. In other words, the dialogue nodes $N_d$ are only connected to the multiple slot nodes $N_s$ using edges e. Since slots $S^j$ have different sets of possible values that the slots $S^j$ may have according to subtypes as shown in Table 2, the slot nodes $N_s$ are only connected to possible value nodes $N_v$ of sets of possible values that the slot nodes $N_s$ may have using edges e. Accordingly, each slot node $N_s$ is connected to all the dialogue nodes $N_d$ and possible value nodes $N_v$ of corresponding possible value sets using edges e. Also, there is no edge e between the dialogue nodes $N_d$, between the slot nodes $N_s$, or between the possible value nodes $N_v$.

A graph generated in this way may be defined using a weighted graph (G=(V, E)), which includes an entire node set V including the dialogue nodes $N_d$, the slot nodes $N_s$, and the possible value nodes $N_v$ and an edge set E including multiple edges connecting all nodes of the node set V to each other, and an N×N binary symmetric adjacency matrix S which represents whether there is an edge e connecting two nodes $v_i$ and $v_j$ of the node set V in the weighted graph (G=(V, E)). Here, N is the sum ($N=N_d+N_s+N_v$) of the number of dialogue nodes $N_d$, the number of slot nodes $N_s$, and the number of possible value nodes $N_v$, and each element $[S]_{ij}$ of the binary symmetric adjacency matrix S has a binary value as an element value according to whether there is an edge $e_{ij}$ connecting two nodes $v_i$ and $v_j$. For example, when there is no edge $e_{ij}$ connecting two nodes $v_i$ and $v_j$ ($(v_i, v_j)\notin e_{ij}$), an element value of the element $[S]_{ij}$ is 0 ($[S]_{ij}=0$), and when there is an edge $e_{ij}$, the element value is 1 ($[S]_{ij}=1$).

Each node $v_i$ in the weighted graph (G=(V, E)) corresponds to an F-dimension input vector ($x_i \in \mathbb{R}^F$) (a slot vector, a turn-specific vector, and a possible value vector) extracted from the first embedding module 13 of the encoder 10. Accordingly, a value graph generated by the value graph generation module 31 may be represented using an N×F input matrix X including an input vector $x_i$ and the binary symmetric adjacency matrix S.

Therefore, the graph neural network model 32 receives the value graph (X;S) represented using the input matrix X and the binary symmetric adjacency matrix S and performs neural network computation on the value graph to extract a value index $p^{n_c}$ that is most relevant for each slot.

The value graph neural network model 32 may be implemented as a neural network including at least one graph attention (GAT) layer and estimates a weight W of each edge e by performing neural network computation on the received value graph. Then, the value graph neural network model 32 extracts a possible value index $p^{n_c}$ for a possible value node $N_v$ connected to a slot node $N_s$ through an edge with the highest estimated weight W among the multiple possible value nodes $N_v$ connected to the multiple slot nodes $N_s$ through edges e. Here, the possible value index $p^{n_c}$ indicates an identifier for all possible values $P^1$ to $P^n$ according to subtypes of the slot.

Meanwhile, the dialogue graph generation module 33 generates a dialogue graph by embedding a slot vector and turn-specific dialogue vectors, which are acquired by the first embedding module 13 for each slot classified as a span slot by the slot classifier 22, into the virtual embedding space.

The dialogue graph generation module 33 generates multiple dialogue nodes $N_d$ by projecting multiple dialogue vectors according to turn-specific dialogues $D_1$ to $D_t$ until the current turn t to the virtual embedding space and generates multiple slot nodes $N_s$ by projecting slot vectors according to multiple span slots. In the case of a span slot, there is no possible value, and thus the dialogue graph generation module 33 generates no possible value node unlike the value graph generation module 31.

The dialogue graph generation module 33 connects the multiple dialogue nodes $N_d$ to each other using edges e based on a turn order. However, a dialogue node $N_d$ for the current turn among the multiple dialogue nodes $N_d$ is connected to all other dialogue nodes $N_d$ using edges e. Also, each of the multiple dialogue nodes $N_d$ is connected to a slot node $N_s$, specifically, a slot node $N_s$ of a slot of which a state value is updated according to the turn-specific dialogues $D_1$ to $D_t$, using an edge e. In the dialogue graph, there is no edge e connecting the slot nodes $N_s$.

The dialogue graph generated by the dialogue graph generation module 33 may also be represented using the input matrix X and the binary symmetric adjacency matrix S like the value graph.

The dialogue graph neural network model 34 receives the dialogue graph (X;S) represented using the input matrix X and the binary symmetric adjacency matrix S and performs neural network computation on the dialogue graph to extract a dialogue turn index $d^{n_s}$ that is most relevant for each slot.

The dialogue graph neural network model 34 may also be implemented as a neural network including at least one GAT layer and estimates a weight W of each edge e by performing neural network computation on the received dialogue graph. Then, the dialogue graph neural network model 34 extracts a dialogue turn index $d^{n_s}$ of a dialogue node $N_d$ connected to a slot node $N_s$ through an edge with the highest estimated weight W among the multiple dialogue nodes $N_d$ connected to the multiple slot nodes $N_s$ through edges e.

The state generator 40 receives multiple possible value indexes $p^{n_c}$ each extracted from multiple categorical slots by the value graph neural network model 32 and multiple dialogue turn indexes $d^{n_s}$ each extracted from multiple span slots by the dialogue graph neural network model 34 to generate a dialogue state $B_t$.

Figure 6:
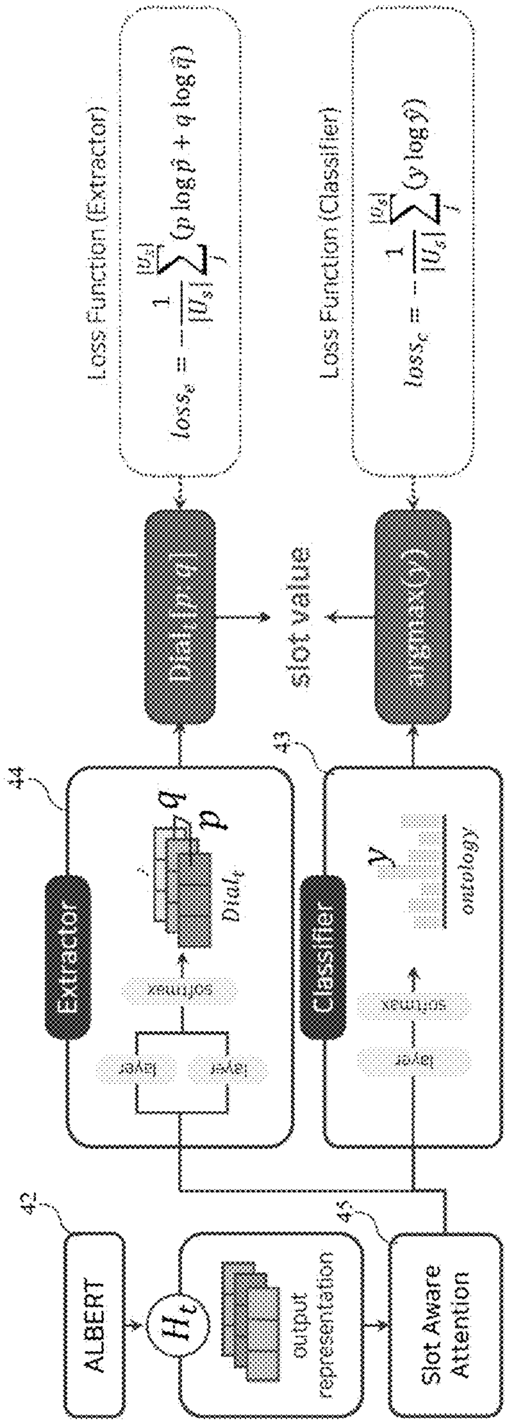
FIG. 6 is a diagram illustrating detailed operations of a state generator of FIG. 2.

FIG. 6 is a diagram illustrating detailed operations of the state generator of FIG. 2.

The state generator 40 may include a sequence recreation module 41, a second embedding module 42, a state value selector 43, and a label extractor 44.

Like the input sequence creation module 12, the sequence recreation module 41 receives a turn-specific dialogue $D_t$ and possible values $P^1$ to $P^n$ of a current turn t and a dialogue state $B_{t-1}$ of a previous turn t−1 together and generates a reconfigured sequence C which is obtained by adding a possible value index and a dialogue turn index $d^{n_s}$ to the input sequence $X_t$. The sequence recreation module 41 may create the reconfigured sequence C as shown in Equation 3.

$$C=[CLS]\oplus\mathcal{D}_t\oplus[SEP]\oplus d^{n_c}\oplus[SEP]\oplus\mathcal{B}_{t-1}\oplus[SEP]\oplus p^{n_c}\quad\text{[Equation 3]}$$

Here, [SEP] is a sequence distinguishment token added for sequence distinguishment.

The sequence recreation module 41 may receive a turn-specific dialogue $D_t$ and possible values $P^1$ to $P^n$ from the dialogue collection module 11 and the possible value setting module 14.

Like the input sequence creation module 12, the sequence recreation module 41 is an element for combining the turn-specific dialogue $D_t$ and the possible values $P^1$ to $P^n$ of the turn t, the dialogue state $B_{t-1}$, the possible value index $p^{n_c}$, and the dialogue index $d^{n_s}$ together and transmitting the combination to the second embedding module 42 and may be omitted.

The second embedding module 42 receives the reconfigured sequence C created by the sequence recreation module 41 and extracts a context representation vector $H_t$. The second embedding module 42 may encode the reconfigured sequence C, which is created and applied by an artificial neural network, through neural network computation to acquire the context representation vector $H_t$. The second embedding module 42 may be implemented as, for example, a lite bidirectional encoder representation from transformer (ALBERT) which is a pretrained language model.

Since the reconfigured sequence C includes both possible value indexes $p^{n_c}$ of categorical slots and dialogue indexes $d^{n_s}$ of span slots among update slots which are to be updated according to the turn-specific dialogue $D_t$ of the current turn t, the context representation vector $H_t$ acquired by the second embedding module 42 may be considered to include information on categorical and span state values which are to be updated in a dialogue state $B_t$.

As shown in FIG. 6, the state generator 40 may further include a slot recognition emphasis module 45 to recognize a format of a slot from the context representation vector $H_t$ acquired from the second embedding module 42 and modify the context representation vector $H_t$ such that a feature according to the recognized format of the slot is emphasized. The slot recognition emphasis module 45 may also be implemented as a neural network and perform neural network computation on the context representation vector $H_t$ to modify the context representation vector $H_t$.

The state value selector 43 receives the context representation vector $H_t$ and selects a state value which is to be updated appropriately for each slot from a possible value set $PV^j$ corresponding to a detailed format of each categorical slot. The state value selector 43 may be implemented as an artificial neural network and perform neural network computation on the received context representation vector $H_t$ to select a state value to be updated from the possible value set $PV^j$. The state value selector 43 may have at least one neural network computation layer to extract slot-specific features from the context representation vector $H_t$, perform softmax operation on the extracted slot-specific features, and select a possible value y with the highest possibility from among the multiple possible values of the possible value set $PV^j$ as a state value.

Meanwhile, the label extractor 44 receives the context representation vector $H_t$ and extracts a label which is a state value of each span slot. The label extractor 44 may also be implemented as an artificial neural network and perform neural network computation on the received context representation vector $H_t$ to estimate a start position p and an end position q of the label in a turn-specific dialogue $D_t$ of a current turn t. A label that represents a state value of a span slot does not have any designated format. Accordingly, a label is not extracted in a limited format such as a word, a phrase, or the like. Therefore, the label extractor 44 has neural network layers which are configured in parallel to estimate a start position p and an end position q of a label which is a state value of each span slot.

Since span slots are included in update slots through hierarchical slot classification, a state value to be updated in a span slot may be considered to be included in a turn-specific dialogue $D_t$ of a turn t. Accordingly, the label extractor 44 may estimate a start position p and an end position q in the turn-specific dialogue $D_t$ of the current turn t to acquire a state value of a span slot in the form of a partial section $D_1$ (p:q) of the turn-specific dialogue $D_t$ of the current turn t.

The state value selector 43 and the label extractor 44 configured as artificial neural networks are trained in advance, and $loss_c$ and $loss_e$ for training the state value selector 43 and the label extractor 44 may be set according to Equations 4 and 5.

$$loss_e=-\frac{1}{|U_s|}\sum_{j}^{|U_s|}(p\log\hat{p}+q\log\hat{q})\quad\text{[Equation 4]}$$

$$loss_c=-\frac{1}{|U_s|}\sum_{j}^{|U_s|}y\log\hat{y}\quad\text{[Equation 5]}$$

Here, $\hat{p}$ and $\hat{q}$ are ratios of all possible start positions and end positions in a turn-specific dialogue $D_t$, and $\hat{y}$ is a possibility of a possible value.

Losses calculated on the basis of training data according to Equations 4 and 5 may be backpropagated such that the state value selector 43 and the label extractor 44 may be trained.

The dialogue state storage module 50 receives state values (y, (p, q)) which are separately acquired from the state generator 40 according to categorical slots and span slots, pairs the slots with the state values, and stores the dialogue state $B_t$ according to the turn-specific dialogues $D_1$ to $D_t$ until the current turn t in the entire dialogue. Then, the dialogue state storage module 50 transmits the stored dialogue state $B_t$ to the input sequence creation module 12 and the sequence recreation module 41 such that a dialogue state $B_{t+1}$ according to a turn-specific dialogue $D_{t+1}$ of the subsequent turn t+1 is acquired.

The dialogue state storage module 50 is separated here to facilitate understanding, but it may be included in the encoder 10. Also, the dialogue state storage module 50, the dialogue collection module 11, and the possible value setting module 14 may be separated as input modules. The input modules may be implemented as storage devices, such as memories, but are not limited thereto.

As a result, the DST device according to the present disclosure divides an entire dialogue into turns, classifies slots extracted from an acquired previous dialogue state and turn-specific dialogues as update slots of which state values are to be updated and inherit slots of which state values are not to be updated first, and hierarchically classifies the update slots as categorical slots which may have limited state values and span slots which may have unlimited state values. Then, the DST device generates a dual dynamic graph of a value graph and a dialogue graph for each of the classified categorical slots and span slots and performs neural network computation on the dual dynamic graphs to extract possible value indexes $p^{n_c}$ of the categorical slots and dialogue turn indexes $d^{n_s}$ of the span slots. Subsequently, the DST device performs neural network computation on the extracted possible value indexes $p^{n_c}$ and the dialogue turn indexes $d^{n_s}$ with a dialogue turn to accurately acquire state values of the categorical slots and state values of the span slots.

The DST device according to the present disclosure hierarchically classifies slots and estimates a state value of each classified slot appropriate for dialogue context on the basis of a dual dynamic graph, thus tracking a dialogue state very accurately.

In the embodiments shown in the drawings, each element may have functions and capabilities other than those described above, and additional elements other than those described above may be included. Also, in an exemplary embodiment, each element may be implemented by one or more physically divided devices, one or more processors, or a combination of one or more processors and software. Unlike what is shown in examples, elements may not be clearly divided in terms of operation.

The DST device shown in FIG. 2 may be implemented as hardware, software, firmware, or a combination thereof in a logic circuit or implemented using a general purpose or special purpose computer. The device may be implemented using a hardwired device, a field programmable gate array (FPGA), an application specific integrated circuit (ASIC), or the like. Also, the device may be implemented as a system on chip (SoC) including one or more processors and a controller.

In addition, the DST device may be installed in a computing device or server with hardware elements in the form of software, hardware, or a combination thereof. The computing device or server may be various devices including all or some of a communication device, such as a communication modem, for communicating with various types of equipment or wired or wireless communication networks, a memory for storing data for executing a program, a microprocessor for executing the program for computation and instructing, and the like.

Figure 7:
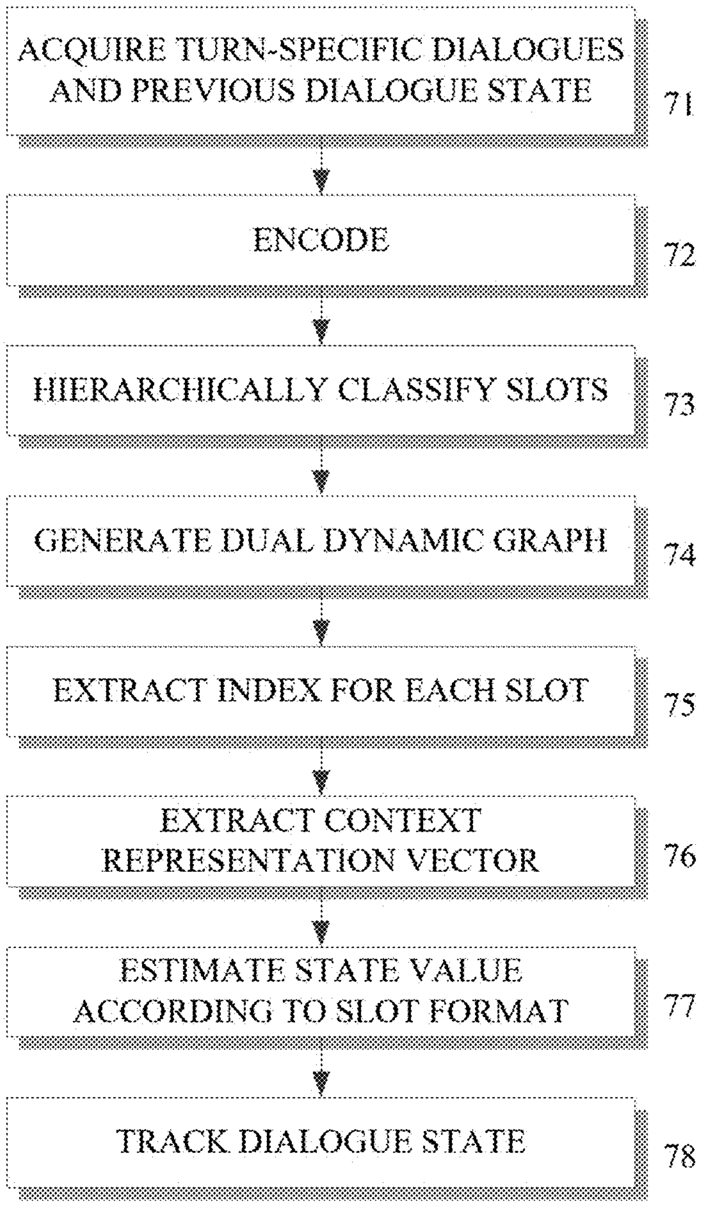
FIG. 7 is a flowchart illustrating a DST method according to an exemplary embodiment.

FIG. 7 is a flowchart illustrating a DST method according to an exemplary embodiment.

The DST method of FIG. 7 will be described with reference to FIGS. 1 to 6. First, turn-specific dialogues $D_t$ based on a turn order and a dialogue state $B_{t-1}$ until a previous turn t−1 are acquired from a multiturn dialogue with a user (71). The acquired dialogues $D_t$ and the dialogue state $B_{t-1}$ acquired until the previous turn t−1 may be combined to generate an input sequence $X_t$. Here, the dialogue state $B_{t-1}$ includes pairs of each of multiple slots and a state value of the slot. Also, possible values $p^1$ to $p^n$ that a state value of a categorical slot among the multiple slots may have may be acquired.

When the turn-specific dialogues $D_t$ and the dialogue state $B_{t-1}$ are acquired, the acquired turn-specific dialogues $D_t$ and the dialogue state $B_{t-1}$ are encoded using neural network computation to generate a dialogue vector and a slot vector (72). Also, when the possible values $p^1$ to $p^n$ are acquired together therewith, a possible value vector may also be generated.

When the dialogue vector and the slot vector are generated, slots are hierarchically classified on the basis of the generated dialogue vector and slot vector (73). Here, the slots may be first classified as update slots and inherit slots depending on whether state values paired with the slots are to be updated according to the turn-specific dialogue $D_t$ of the current turn t, and the classified update slots may be hierarchically classified as categorical slots which may have state values limited to possible values and span slots which may have unlimited state values.

When the slots are hierarchically classified, a dual dynamic graph is generated according to the classified categorical slots and span slots (74). Here, the dual dynamic graph is generated as two graphs, that is, a value graph for the classified categorical slots and a dialogue graph for the span slots. The value graph between the two graphs includes multiple dialogue nodes $N_d$, multiple slot nodes $N_s$, multiple possible value nodes $N_v$, and edges connecting the nodes on the basis of turn-specific dialogue vectors until a current turn t and slot vectors and possible value vectors for the categorical slots. In the value graph, each slot node $N_s$ may be connected to the multiple dialogue nodes $N_d$ and the multiple possible value nodes $N_v$ using edges e, and there is no edge e between the dialogue nodes $N_d$, between the slot nodes $N_s$, or between the possible value nodes $N_v$.

The dialogue graph includes multiple dialogue nodes $N_d$ and multiple slot nodes $N_s$ on the basis of turn-specific dialogue vectors until a current turn t and slot vectors for the span slots. The multiple dialogue nodes $N_d$ are basically connected to each other through edges based on the turn order, and a dialogue node $N_d$ for a turn-specific dialogue $D_t$ of the current turn t is connected to all other dialogue nodes through edges e. The dialogue node $N_d$ is connected to a slot node $N_s$ of a slot of which a state value is updated according to the corresponding turn-specific dialogue $D_t$ through an edge.

When the value graph and the dialogue graph are generated, neural network computation is performed on each of the generated value graph and dialogue graph to estimate the relationship between nodes and give weights W to edges, and a possible value or dialogue having the closest correlation with each slot according to the given weight is estimated to extract possible value indexes $p^{n_c}$ of the categorical slots and dialogue turn indexes $d^{n_s}$ of the span slots (75).

When the possible value indexes $p^{n_c}$ and the dialogue turn indexes $d^{n_c}$ are extracted, neural network computation is performed on the extracted possible value indexes $p^{n_c}$ and dialogue turn indexes $d^{n_s}$ with respect to the turn-specific dialogues $D_t$, dialogue states $B_{t-1}$, and possible value sets to extract a context representation vector $H_t$ (76).

Like the input sequence $X_t$, when the possible value indexes $p^{n_c}$ and the dialogue turn indexes $d^{n_s}$ are extracted, the extracted possible value indexes $p^{n_c}$ and dialogue turn indexes $d^{n_s}$ are combined with the turn-specific dialogues $D_t$, the dialogue states $B_{t-1}$, and the possible value sets to generate a reconfigured sequence C, and neural network computation is performed on the generated reconfigured sequence C to extract the context representation vector $H_t$.

When the context representation vector $H_t$ is extracted, neural network computation is performed on the context representation vector $H_t$ to estimate state values according to slot formats (77). Here, for a categorical slot, the most appropriate possible value is selected from among multiple possible values that the categorical slot may have, and extracted as a state value. Also, for a span slot, a start position and an end position of words including a state value in the turn-specific dialogue $D_t$ of the current turn t are estimated, and words between the estimated start position and end position are extracted as a state value.

When the state value is estimated, a state value extracted from each of the categorical slots and span slots in the update slots is paired with the slot, excluding the inherit slots which do not require state value updates. Accordingly, the dialogue state $B_t$ including slot-state-value pairs until the current turn t can be tracked.

Although it has been described that operations of FIG. 7 are sequentially performed, this is illustrative, and those of ordinary skill in the art may variously alter and modify the operations by changing the order illustrated in FIG. 7, performing two or more operations in parallel, or adding another operation without departing from the fundamental characteristics of the exemplary embodiment of the present invention.

Figure 8:
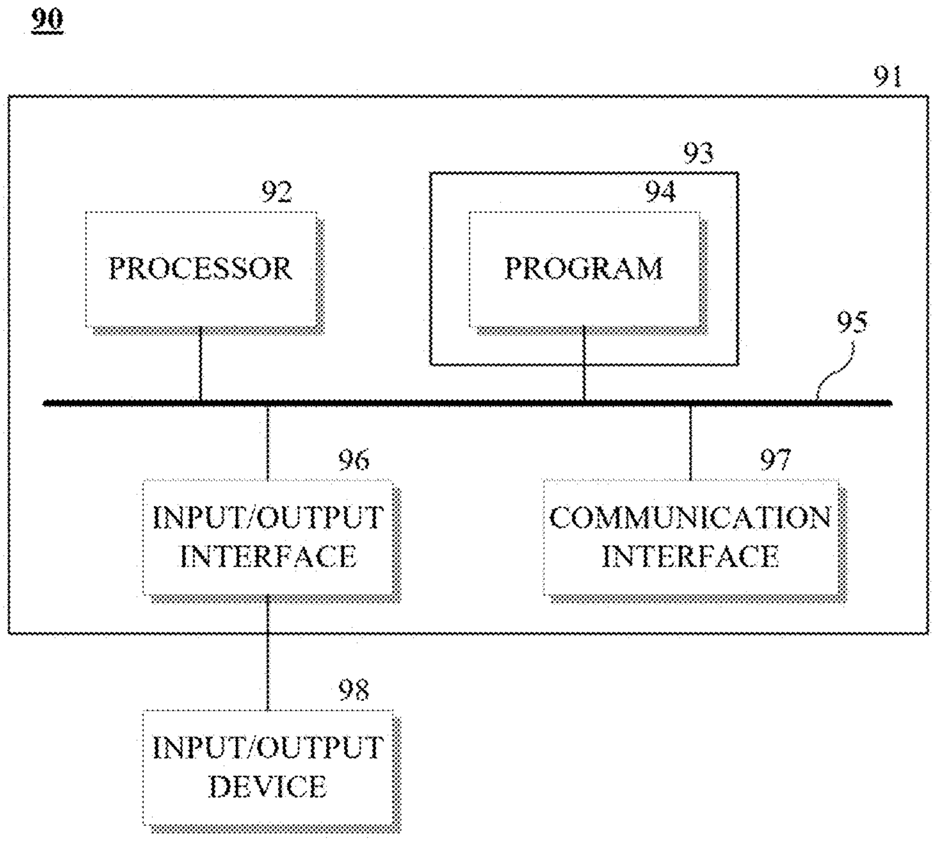
FIG. 8 is a diagram illustrating a computing environment including a computing device according to an exemplary embodiment.

FIG. 8 is a diagram illustrating a computing environment including a computing device according to an exemplary embodiment.

In the exemplary embodiment shown in the drawing, each component may have functions and capabilities other than those described below, and additional components other than those described below may be included. A computing environment 90 shown in the drawing may include a computing device 91 to perform the DST method of FIG. 7. According to the exemplary embodiment, the computing device 91 may be one or more components included in the DST device of FIG. 2.

The computing device 91 includes at least one processor 92, a computer-readable storage medium 93, and a communication bus 95. The processor 92 may cause the computing device 91 to operate according to the foregoing exemplary embodiment. For example, the processor 92 may execute one or more programs 94 stored in the computer-readable storage medium 93. The one or more programs 94 may include one or more computer-executable instructions, and the computer-executable instructions may be configured to cause the computing device 91 to perform operations according to the exemplary embodiment when executed by the processor 92.

The communication bus 95 connects various components of the computing device 91 including the processor 92 and the computer-readable storage medium 93 to each other.

The computing device 91 may include at least one input/output interface 96 which provides an interface for at least one input/output device 98 and at least one communication interface 97. The input/output interface 96 and the communication interface 97 are connected to the communication bus 95. The input/output device 98 may be connected to other components of the computing device 91 through the input/output interface 96. The exemplary input/output device 98 may include input devices, such as a pointing device (a mouse, a trackpad, or the like), a keyboard, a touch input device (a touchpad, a touchscreen, or the like), a voice or sound input device, various types of sensor devices, and/or an imaging device, and/or output devices such as a display device, a printer, a speaker, and/or a network card. The exemplary input/output device 98 may be included in the computing device 91 as a component of the computing device 91 or connected to the computing device 91 as a device separate from the computing device 91.

With a device and method for DST according to the present disclosure, it is possible to accurately track an appropriate dialogue state for a user's intention by hierarchically classifying each slot in consideration of multiple features of domain-specific slots extracted from a dialogue with the user and tracking a state value of each of the hierarchically classified slots using a dual dynamic graph neural network.

Although the present invention has been described above with reference to the exemplary embodiments, those of ordinary skill in the art should understand that various modifications and other equivalent embodiments can be made from the embodiments. Therefore, the technical scope of the present invention should be determined from the technical spirit of the following claims.

What is claimed is:

1. A device for dialogue state tracking (DST), the device comprising:

a memory; and a processor configured to execute at least some of operations based on a program stored in the memory, wherein, in dialogue states including pairs of each of multiple slots and a state value according to turn-specific dialogues of a multiturn dialogue, the processor determines whether a state value of each of the multiple slots is updated to classify the multiple slots as inherit slots and update slots, determines whether state values that the update slots have are limited to predefined multiple possible values to hierarchically classify the update slots as categorical slots and span slots, and acquires and updates a state value of each of the categorical slots and the span slots using a possible value index and a dialogue index which are extracted by separately generating a value graph for the classified categorical slots and a dialogue graph for the span slots and performing neural network computation on the value graph and the dialogue graph, wherein the value graph comprises multiple dialogue nodes, multiple slot nodes, and multiple possible value nodes connected by edges, and the dialogue graph comprises multiple dialogue nodes and multiple slot nodes connected by edges without possible value nodes, wherein the neural network computation on the value graph extracts the possible value index indicating a possible value most likely to be paired with each of the categorical slots, and the neural network computation on the dialogue graph extracts the dialogue index indicating a turn-specific dialogue having closest correlation with each of the span slots, and wherein the possible value index is generated before acquiring and updating the state value of each of the categorical slots and is used to acquire and update the state value of each of the categorical slots, and the dialogue index is generated before acquiring and updating the state value of each of the span slots and is used to acquire and update the state value of each of the span slots, wherein the processor separately generates the value graph and the dialogue graph using different node sets and different edge connections, the value graph being generated by connecting the multiple dialogue nodes, the multiple slot nodes, and the multiple possible value nodes using edges, and the dialogue graph being generated by connecting the multiple dialogue nodes and the multiple slot nodes using edges based on a turn order and turns in which the state values of the dialogue states are updated, and wherein no additional task is performed on the inherit slots, reducing computational cost.

2. The device of claim 1, wherein the processor extracts the turn-specific dialogues from the multiturn dialogue based on the turn order, receives the turn-specific dialogues based on the turn order with the dialogue states which are tracked according to the turn-specific dialogues until a previous turn, and encodes the turn-specific dialogues and the dialogue states to generate multiple dialogue vectors and multiple slot vectors.

3. The device of claim 2, wherein the processor further acquires a possible value set including all state values that the categorical slots among the multiple slots have and encodes the acquired possible value set to generate multiple possible value vectors.

4. The device of claim 2, wherein, in the value graph, the processor connects the multiple slot nodes to the multiple dialogue nodes and the multiple possible value nodes according to detailed formats of the multiple slot nodes using edges, and in the dialogue graph, the processor connects the multiple dialogue nodes based on the turn order using edges, connects a dialogue node for a current turn-specific dialogue to all other dialogue nodes using edges, and connects each of the multiple slot nodes to a dialogue node of a turn in which a state value of the dialogue states is updated using an edge.

5. The device of claim 2, wherein the processor estimates a weight of each edge by performing neural network computation on the value graph, determines a possible value that is most likely to be paired with each categorical slot among the multiple possible values, and extracts the possible value index, and the processor estimates a weight of each edge by performing neural network computation on the dialogue graph, determines the turn-specific dialogue having closest correlation with each of the span slotsslot among the turn-specific dialogues, and extracts the dialogue index.

6. The device of claim 1, wherein the processor receives and encodes the turn-specific dialogues, the dialogue states, the possible value index, the dialogue index, and the multiple possible values using neural network computation to acquire a context representation vector.

7. The device of claim 6, wherein the processor performs neural network computation on the context representation vector to select and acquire a state value to be updated in the categorical slots from among the multiple possible values.

8. The device of claim 6, wherein the processor performs neural network computation on the context representation vector to extract a state value to be updated in the span slots from a current turn-specific dialogue.

9. A method for dialogue state tracking (DST) performed by a processor, the method comprising:

in dialogue states including pairs of each of multiple slots and a state value according to turn-specific dialogues of a multiturn dialogue, classifying the multiple slots as inherit slots and update slots by determining whether a state value of each of the multiple slots is updated, and hierarchically classifying the update slots as categorical slots and span slots by determining whether state values that the update slots have are limited to predefined multiple possible values; and acquiring and updating a state value of each of the categorical slots and the span slots using a possible value index and a dialogue index which are extracted by separately generating a value graph for the classified categorical slots and a dialogue graph for the span slots and performing neural network computation on the value graph and the dialogue graph, wherein the value graph comprises multiple dialogue nodes, multiple slot nodes, and multiple possible value nodes connected by edges, and the dialogue graph comprises multiple dialogue nodes and multiple slot nodes connected by edges without possible value nodes, wherein the neural network computation on the value graph extracts the possible value index indicating a possible value most likely to be paired with each of the categorical slots, and the neural network computation on the dialogue graph extracts the dialogue index indicating a turn-specific dialogue having closest correlation with each of the span slots, and wherein the possible value index is generated before acquiring and updating the state value of each of the categorical slots and is used to acquire and update the state value of each of the categorical slots, and the dialogue index is generated before acquiring and updating the state value of each of the span slots and is used to acquire and update the state value of each of the span slots, wherein the processor separately generates the value graph and the dialogue graph using different node sets and different edge connections, the value graph being generated by connecting the multiple dialogue nodes, the multiple slot nodes, and the multiple possible value nodes using edges, and the dialogue graph being generated by connecting the multiple dialogue nodes and the multiple slot nodes using edges based on a turn order and turns in which the state values of the dialogue states are updated, and wherein no additional task is performed on the inherit slots, reducing computational cost.

10. The method of claim 9, wherein the classifying of the multiple slots comprises:

extracting the turn-specific dialogues from the multiturn dialogue based on the turn order; and receiving the turn-specific dialogues based on the turn order with the dialogue states which are tracked according to the turn-specific dialogues until a previous turn, and encoding the turn-specific dialogues and the dialogue states to generate multiple dialogue vectors and multiple slot vectors.

11. The method of claim 10, wherein the classifying of the multiple slots comprises:

further acquiring a possible value set including all state values that the categorical slots among the multiple slots have; and encoding the acquired possible value set to generate multiple possible value vectors.

12. The method of claim 9, wherein the updating of the state value of each of the categorical slots and the span slots comprises:

in the value graph, connecting the multiple slot nodes to the multiple dialogue nodes and the multiple possible value nodes according to detailed formats of the slots using edges, and in the dialogue graph, connecting the multiple dialogue nodes based on the turn order using edges, connecting a dialogue node for a current turn-specific dialogue to all other dialogue nodes using edges, and connecting each of the multiple slot nodes to a dialogue node of a turn in which a state value of the dialogue states is updated using an edge.

13. The method of claim 9, wherein the updating of the state value of each of the categorical slots and the span slots comprises:

estimating a weight of each edge by performing neural network computation on the value graph, determining a possible value that is most likely to be paired with each categorical slot among the multiple possible values, and extracting the possible value index, and estimating a weight of each edge by performing neural network computation on the dialogue graph, determining the turn-specific dialogue having closest correlation with each of span slots among the turn-specific dialogues, and extracting the dialogue index.

14. The method of claim 9, wherein the updating of the state value of each of the categorical slots and the span slots comprises receiving and encoding the turn-specific dialogues, the dialogue states, the possible value index, the dialogue index, and the multiple possible values using neural network computation to acquire a context representation vector.

15. The method of claim 14, wherein the updating of the state value of each of the categorical slots and the span slots comprises performing neural network computation on the context representation vector to select and acquire a state value to be updated in the categorical slots from among the multiple possible values.

16. The method of claim 14, wherein the updating of the state value of each of the categorical slots and the span slots comprises performing neural network computation on the context representation vector to extract a state value to be updated in the span slots from a current turn-specific dialogue.

* * * * *